(12) United States Patent
Shapiro et al.

(10) Patent No.: US 11,187,455 B2
(45) Date of Patent: Nov. 30, 2021

(54) CARGO-NEUTRAL TESTING OF CONTAINER DURING MODE TRANSITION

(71) Applicant: Carrier Corporation, Farmington, CT (US)

(72) Inventors: Aryn Shapiro, Syracuse, NY (US); David V. Soergel, Jamesville, NY (US); Cheryl M. Keiling, Camillus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 237 days.

(21) Appl. No.: 15/578,315

(22) PCT Filed: May 31, 2016

(86) PCT No.: PCT/US2016/035002
§ 371 (c)(1),
(2) Date: Nov. 30, 2017

(87) PCT Pub. No.: WO2016/196457
PCT Pub. Date: Dec. 8, 2016

(65) Prior Publication Data
US 2018/0156536 A1    Jun. 7, 2018

Related U.S. Application Data

(60) Provisional application No. 62/169,242, filed on Jun. 1, 2015.

(51) Int. Cl.
*G05B 23/02*    (2006.01)
*F25D 29/00*    (2006.01)
*F25B 49/00*    (2006.01)

(52) U.S. Cl.
CPC .......... *F25D 29/003* (2013.01); *F25B 49/005* (2013.01); *G05B 23/0213* (2013.01); *G05B 2219/2614* (2013.01)

(58) Field of Classification Search
CPC .............. F25D 29/003; G05B 23/0213; G05B 2219/2614; F25B 49/005
See application file for complete search history.

(56) References Cited

U.S. PATENT DOCUMENTS

| 4,538,419 A | 9/1985 | Lord |
| 5,181,389 A | 1/1993 | Hanson et al. |

(Continued)

FOREIGN PATENT DOCUMENTS

| EP | 1022525 A1 | 7/2000 |
| EP | 2597405 A1 | 5/2013 |

(Continued)

OTHER PUBLICATIONS

Asset Intelligence, "VeriWise™ Reefer Monitoring with Control (GSM-D200)", I.D. Systems, Inc., 2014, 2 pages.

(Continued)

*Primary Examiner* — Rocio Del Mar Perez-Velez
*Assistant Examiner* — Marzia T Monty
(74) *Attorney, Agent, or Firm* — Cantor Colburn LLP

(57) ABSTRACT

A cargo-neutral climate control diagnostic system for a climate controlled mobile container includes a controller configured and disposed to be connected to one or more climate control components. The controller is configured and disposed to identify a cargo-neutral test opportunity and conduct a test to determine an operational state of the one or more climate control components of the climate controlled mobile cargo container while maintaining a desired environment.

20 Claims, 1 Drawing Sheet

(56) References Cited

U.S. PATENT DOCUMENTS

| | | | |
|---|---|---|---|
| 5,437,163 A | 8/1995 | Jurewicz et al. | |
| 5,438,841 A | 8/1995 | Cahill-O'Brien et al. | |
| 6,067,805 A | 5/2000 | Porter et al. | |
| 6,233,952 B1 | 5/2001 | Porter et al. | |
| 6,679,071 B1* | 1/2004 | Storey | A47F 3/04 |
| | | | 62/126 |
| 7,784,290 B2 | 8/2010 | Shah | |
| 8,109,101 B2 | 2/2012 | Taras et al. | |
| 9,097,456 B2* | 8/2015 | Thogersen | F25D 29/003 |
| 2004/0172954 A1 | 9/2004 | Hanson et al. | |
| 2005/0228607 A1* | 10/2005 | Simons | G05D 23/1917 |
| | | | 702/122 |
| 2006/0042282 A1* | 3/2006 | Ludwig | F25B 41/04 |
| | | | 62/222 |
| 2008/0129490 A1 | 6/2008 | Linville et al. | |
| 2009/0025406 A1* | 1/2009 | Yoshimi | F24F 11/83 |
| | | | 62/127 |
| 2011/0221573 A1 | 9/2011 | Huat | |
| 2013/0024028 A1* | 1/2013 | Hadzidedic | G05B 19/0426 |
| | | | 700/276 |
| 2013/0138251 A1* | 5/2013 | Thogersen | G05D 23/1917 |
| | | | 700/278 |
| 2013/0338836 A1* | 12/2013 | Vaughn | F24F 11/30 |
| | | | 700/276 |

FOREIGN PATENT DOCUMENTS

| | | |
|---|---|---|
| JP | H08219601 A | 8/1996 |
| WO | 2014055525 A1 | 4/2014 |
| WO | 2015028072 A1 | 5/2015 |

OTHER PUBLICATIONS

International Search Report and Written Opinion for application PCT/US2016/035002, dated Aug. 5, 2016, 10 pages.

* cited by examiner

CARGO-NEUTRAL TESTING OF CONTAINER DURING MODE TRANSITION

BACKGROUND

Exemplary embodiments pertain to the art of climate controlled mobile cargo containers and, more particularly, to a climate controlled mobile cargo container having a cargo-neutral diagnostic system.

Climate control systems include a number of active and passive components that operate synergistically to environmentally condition a space. In some cases, that space may take the form of a mobile container use to transport cargo from one location to another. Both the passive and active components are subject to periodic maintenance including diagnostic testing. Diagnostic testing is performed when the space is empty to avoid having a negative impact on cargo.

BRIEF DESCRIPTION

Disclosed is a cargo-neutral climate control diagnostic system for a climate controlled mobile container including a controller configured and disposed to be connected to one or more climate control components. The controller is configured and disposed to identify a cargo-neutral test opportunity and conduct a test to determine an operational state of the one or more climate control components of the climate controlled mobile cargo container while maintaining selected environmental conditions.

In addition to one or more of the features described above or below, or as an alternative, further embodiments could include wherein the cargo-neutral test opportunity includes a transition from a first operating mode to a second operating mode.

In addition to one or more of the features described above or below, or as an alternative, further embodiments could include wherein the first operating mode includes one of a system start-up mode, a cooling mode, a fan speed mode, and a defrost mode.

In addition to one or more of the features described above or below, or as an alternative, further embodiments could include wherein the second operating mode includes another of the cooling mode, the fan speed mode, and the defrost mode.

In addition to one or more of the features described above or below, or as an alternative, further embodiments could include wherein the test includes at least one of an electrical response test, a sensor response test, a multiple sensor correlation test, a system/environment correlation test, and a refrigerant flow test.

Also disclosed is a climate controlled mobile cargo container including a container body having an outer surface and an interior storage compartment. A climate control system is operatively connected to condition the interior storage compartment. The climate control system includes a plurality of climate control components. A cargo-neutral climate control diagnostic system includes a controller connected to one or more of the plurality of climate control components. The controller is configured and disposed to identify a cargo-neutral test opportunity and conduct a test to determine an operational state of the one or more climate control components of the climate controlled mobile cargo container while maintaining selected environmental conditions.

In addition to one or more of the features described above or below, or as an alternative, further embodiments could include wherein the cargo-neutral test opportunity includes a transition from a first operating mode to a second operating mode.

In addition to one or more of the features described above or below, or as an alternative, further embodiments could include wherein the first operating mode includes one of a system start-up mode, a cooling mode, a fan speed mode, and a defrost mode.

In addition to one or more of the features described above or below, or as an alternative, further embodiments could include wherein the second operating mode includes another of the cooling mode, the fan speed mode, and the defrost mode.

In addition to one or more of the features described above or below, or as an alternative, further embodiments could include wherein the test includes at least one of an electrical response test, a sensor response test, a multiple sensor correlation test, a system/environment correlation test, and a refrigerant flow test.

Further disclosed is a method of conducting a cargo-neutral diagnostic test of a climate controlled mobile cargo container. The method includes detecting a cargo-neutral testing opportunity having a cargo-neutral test period, and running a diagnostic test of one or more climate control components of the climate controlled mobile cargo container during the cargo-neutral test period.

In addition to one or more of the features described above or below, or as an alternative, further embodiments could include wherein detecting a cargo-neutral testing opportunity includes determining a first operating mode, a second operating mode and a transition from the first operating mode to the second operating mode.

In addition to one or more of the features described above or below, or as an alternative, further embodiments could include wherein determining the first operating mode includes sensing a current operating mode and determining the second operating mode includes predicting a future operating mode.

In addition to one or more of the features described above or below, or as an alternative, further embodiments could include wherein determining the first operating mode includes sensing one of a system start-up mode, a cooling mode, a fan speed mode, and a defrost mode.

In addition to one or more of the features described above or below, or as an alternative, further embodiments could include wherein determining the second operating mode includes predicting another of the cooling mode, the fan speed mode, and the defrost mode.

In addition to one or more of the features described above or below, or as an alternative, further embodiments could include wherein running the diagnostic test includes running at least one of an electrical response test, a sensor response test, a multiple sensor correlation test, a system/environment correlation test, and a refrigerant flow test.

In addition to one or more of the features described above or below, or as an alternative, further embodiments could include wherein running the diagnostic test includes running a diagnostic of one or more active climate control components.

In addition to one or more of the features described above or below, or as an alternative, further embodiments could include wherein running the diagnostic test includes selecting a cargo-neutral diagnostic test of at least one of the one or more climate control components.

In addition to one or more of the features described above or below, or as an alternative, further embodiments could include wherein selecting the cargo-neutral diagnostic test includes selecting a cargo-neutral diagnostic test sequence of the cargo-neutral diagnostic test.

In addition to one or more of the features described above or below, or as an alternative, further embodiments could include wherein running the diagnostic test of one or more climate control components includes implementing a passive diagnostic test of the one or more climate control components.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
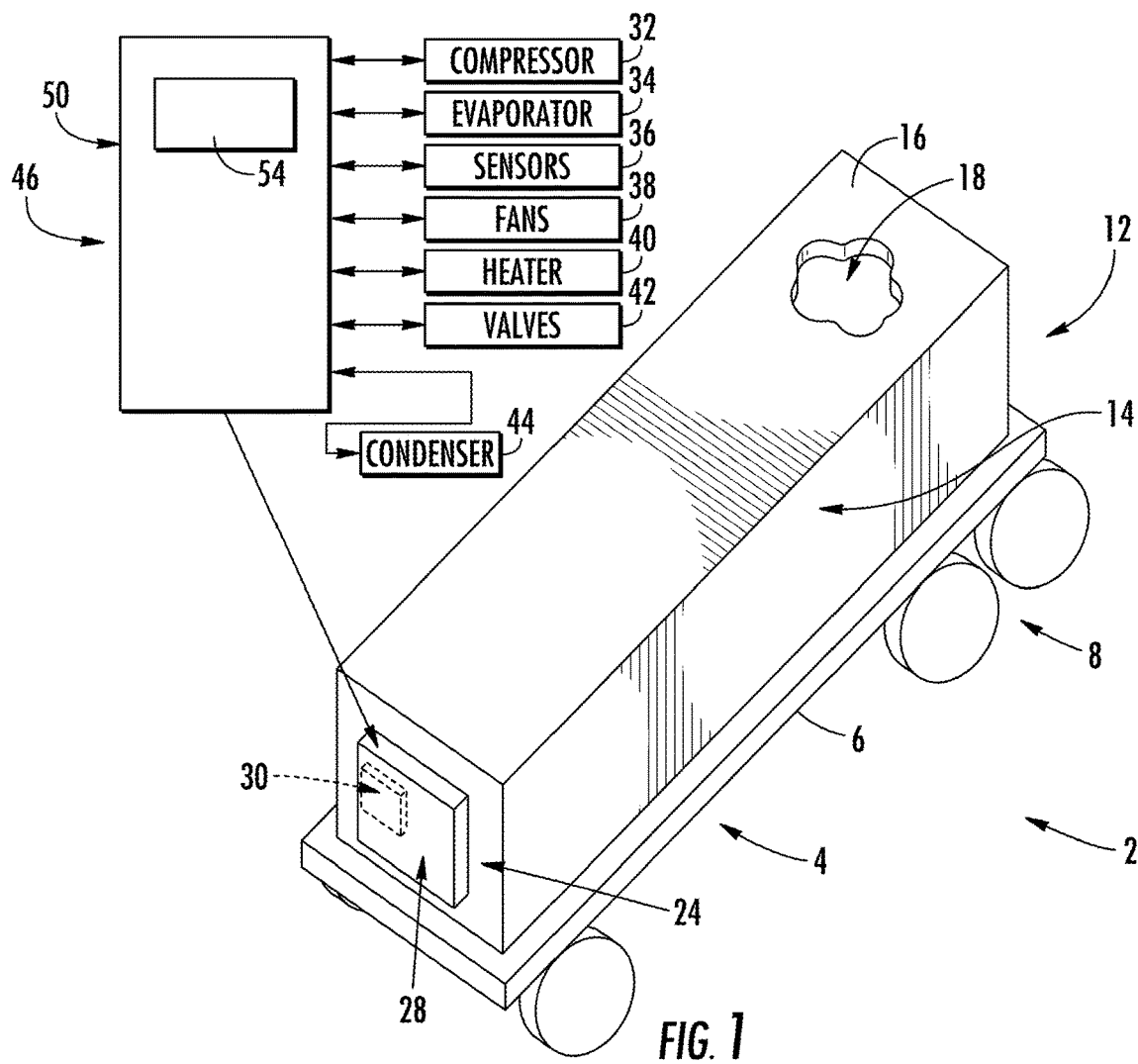
FIG. 1 depicts a partially cut-away view of a climate controlled mobile cargo container including a cargo-neutral diagnostic system, in accordance with an exemplary embodiment.

A climate controlled mobile cargo container system, in accordance with an exemplary embodiment, is indicated generally at 2, in FIG. 1. Climate controlled mobile cargo container system 2 includes a transport vehicle 4 having a bed 6 supported by a plurality of wheels indicated generally at 8. A climate controlled mobile cargo container 12 is supported on bed 6. Climate controlled mobile cargo container 12 includes a body 14 having an outer surface 16 and an interior storage compartment 18. Interior storage compartment 18 maintains selected environmental conditions which facilitate transportation of various types of cargo. The selected environmental conditions may include temperature, humidity, and the like. At this point, it should be understood that the climate controlled mobile container may take on a variety of forms including climate controlled containers suitable for rail transport, ocean/sea/river transport, overland transport, aerial transport, and the like.

In accordance with an exemplary embodiment, climate controlled mobile cargo container 12 includes a climate control system 24 that is operated to establish and maintain the selected environmental conditions in interior storage compartment 18. Climate control system 24 may operate as a refrigeration system and/or a heating system depending upon a desired environment in interior storage compartment 18. Climate control system 24 includes a housing 28 that may be mounted to outer surface 16. Of course, it should be understood, that housing 28 may also be mounted within interior storage compartment 18. Housing 28 surrounds a plurality of climate control components indicated generally at 30. It should be understood, that climate control system 24 may include additional climate control components arranged in interior storage compartment 18.

Plurality of climate control components 30 may include a compressor 32, an evaporator 34, sensors 36, fans 38, a heater 40, valves 42, and a condenser 44. Sensors 36 may detect various parameters associated with climate control system 24 and/or interior storage compartment 18. Fans 38 may be provided at evaporator 34 and condenser 44. Valves 42 may be arranged to control a flow of refrigerant through climate control system 24. At this point it should be understood that the number, type, arrangement, and inter-connectivity of the plurality of climate control components 30 may vary.

In accordance with an exemplary embodiment, climate control system 24 includes a cargo-neutral climate control diagnostic system 46. Cargo-neutral climate control diagnostic system 46 includes a controller 50 and a diagnostic test module 54 which, as will be discussed more fully below, establishes and runs cargo-neutral diagnostic tests of one or more of the plurality of climate control components 30. At this point, it should be understood, that the term "cargo-neutral" defines a diagnostic test that may be performed without having more than a minimal impact on the selected environmental conditions within interior storage compartment 18. In this manner, diagnostic tests may be performed on one or more of the plurality of climate control components 30 while interior storage compartment 18 houses and maintains a cargo load (not shown) at selected environmental conditions.

Figure 2:
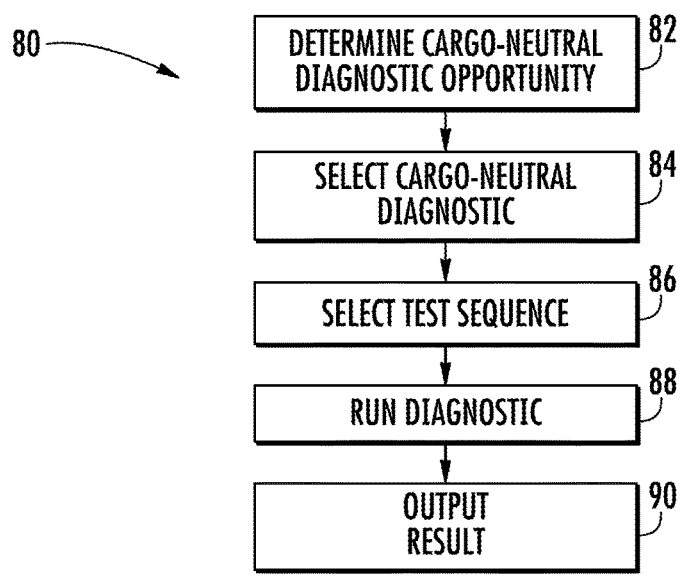
FIG. 2 depicts a flow chart illustrating a method of conducting a cargo-neutral diagnostic test of the climate controlled mobile cargo container of FIG. 1.

Reference will now follow to FIG. 2 in describing a method 80 of conducting a cargo-neutral diagnostic of climate control system 24. Diagnostic test module 54 identifies a cargo-neutral test opportunity in block 82. A cargo-neutral test opportunity may represent a transition between a first mode of operation and a second mode of operation. At this point, it should be understood that a mode represents a collection of machinery states. A "cargo-neutral test opportunity", in accordance with an aspect of an exemplary embodiment, represents a transition in machinery states as well as an impact on one or more of the plurality of climate control components 30 and/or the selected environmental conditions that may result from the transition.

In accordance with an aspect of an exemplary embodiment, the first mode of operation may represent a current mode of operation and the second mode of operation may represent a future mode. For example, a cargo-neutral test opportunity may occur between one of a start-up mode, a deforest mode, an operating mode, and the like and another of a defrost mode, an operating mode, and the like. For example, a cargo-neutral test opportunity may exist when climate control system 24 transitions from a defrost mode to an operating mode, from a start-up mode to an operating mode, from a first fan speed mode to a second fan speed mode, and the like. It should be understood that the operating mode may include either a refrigeration mode or a heating mode.

In block 84, a cargo-neutral diagnostic test is selected. The cargo-neutral test may be associated with the cargo-neutral opportunity, and a desired sequence of the test is selected in block 86. The test sequence is established so as to have a neutral, or substantially neutral, effect on cargo in interior storage compartment 18. For example, an opportunity to test one of fans 38 may present itself at a transition from fan off, or fan operating, and a future high speed operation. A diagnostic test may be run as indicated in block 88. During such an opportunity, fan 38 may be staged from off to low speed, from low speed to off, and from off to high speed. Sensors 36 may detect various parameters, such a voltage drops, current draw, and the like at each stage to determine fan 38 health and a test result may be output in block 90.

At this point, it should be understood that the number of opportunities and tests during each opportunity may vary. It should also be understood that the impact of each of the plurality of climate control components on the selected environmental condition when transitioning from one mode to another mode is calculable. An opportunity will be deemed a cargo-neutral test opportunity when a predicted test impact is sufficiently less than, or sufficiently near to, an overall impact on the selected environmental conditions resulting from a transition due to standard system control. That is, once a cargo-neutral test opportunity has been determined, a testing sequence is formulated such that components change state no more than, or at best minimally more than, that which would occur during a standard mode transition.

Further, it should be understood that the types of tests which may take place during a cargo-neutral test opportunity may vary and could include electrical characteristic tests, sensor response tests, multiple sensor correlation tests, system vs. environment correlation tests, refrigerant flow tests, and the like. Electrical characteristic tests may include current utilization, time domain response of current utilization, change of current utilization over time, and the like. Sensor response tests may include end limits tests, time domain response of sensors, and changes in response characteristics over time. Multiple sensor correlation tests may include comparing sensors for mutual tractability and consistency. System vs. environment correlations may include comparing system responses to modeled responses. Refrigerant flow tests may include checking for flow discrepancies at various portions of climate control system 24.

The above are just a few examples of the types of tests and opportunities that may be employed by diagnostic test module 54. Further, it should be understood that diagnostic test module 54 autonomously or passively performs each test. That is, without human intervention, diagnostic test module 54 identifies a test opportunity, selects an appropriate cargo-neutral test, develops a cargo-neutral test sequence, and conducts a diagnostic test of one or more of climate control components 30 without any appreciable effect on cargo stored in interior storage compartment 18. In this manner, the exemplary embodiments enhance diagnostic testing of climate control components associated with a mobile cargo container. That is, the exemplary embodiments improve testing methodologies in a manner which achieves diagnostic goals that enhance system reliability and component life while, at the same time, ensuring a neutral or minimal impact on the selected environmental conditions within the mobile cargo container.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cargo-neutral climate control diagnostic system for a climate controlled mobile cargo container comprising:
   a controller configured to be connected to one or more climate control components, the controller being configured to identify a cargo-neutral test opportunity and conduct a test during the cargo-neutral test opportunity to determine an operational state of the one or more climate control components of the climate controlled mobile cargo container while maintaining selected environmental conditions in the mobile cargo container;
   wherein the cargo-neutral test opportunity includes a transition from a first operating mode to a second operating mode different than the first operating mode, wherein the first operating mode comprises a first set of machinery states and the second operating mode comprises a second set of machinery states different than the first set of machinery states.

2. The cargo-neutral climate control diagnostic system according to claim 1, wherein the first operating mode includes one of a system start-up mode, a cooling mode, a fan speed mode, and a defrost mode.

3. The cargo-neutral climate control diagnostic system according to claim 2, wherein the second operating mode includes one of the cooling mode, the fan speed mode, and the defrost mode.

4. The cargo-neutral climate control diagnostic system according to claim 1, wherein the test includes at least one of an electrical response test, a sensor response test, a multiple sensor correlation test, a system/environment correlation test, and a refrigerant flow test.

5. The cargo-neutral climate control diagnostic system according to claim 1, wherein the selected environmental conditions comprise temperature.

6. The cargo-neutral climate control diagnostic system according to claim 1, wherein the transition from the first operating mode to the second operating mode comprises at least one of (i) transition from a defrost mode to an operating mode, (ii) transition from a start-up mode to an operating mode and (iii) transition from a first fan speed mode to a second fan speed mode.

7. The cargo-neutral climate control diagnostic system according to claim 6, wherein the operating mode comprises one of a refrigeration mode or a heating mode.

8. A climate controlled mobile cargo container comprising:
   a container body including an outer surface and an interior storage compartment;
   a climate control system operatively connected to condition the interior storage compartment, the climate control system including a plurality of climate control components; and
   a cargo-neutral climate control diagnostic system comprising:
   a controller connected to one or more of the climate control components, the controller being configured to identify a cargo-neutral test opportunity and conduct a test during the cargo-neutral test opportunity to determine an operational state of the one or more climate control components of the climate controlled mobile cargo container while maintaining selected environmental conditions in the mobile cargo container;

wherein the cargo-neutral test opportunity includes a transition from a first operating mode to a second operating mode different than the first operating mode, wherein the first operating mode comprises a first set of machinery states and the second operating mode comprises a second set of machinery states different than the first set of machinery states.

9. The climate controlled mobile cargo container according to claim 8, wherein the first operating mode includes one of a system start-up mode, a cooling mode, a fan speed mode, and a defrost mode.

10. The climate controlled mobile cargo container according to claim 9, wherein the second operating mode includes one of the cooling mode, the fan speed mode, and the defrost mode.

11. The climate controlled mobile cargo container according to claim 8, wherein the test includes at least one of an electrical response test, a sensor response test, a multiple sensor correlation test, a system/environment correlation test, and a refrigerant flow test.

12. A method of conducting a cargo-neutral diagnostic test of a climate controlled mobile cargo container, the method comprising:
   detecting a cargo-neutral testing opportunity having a cargo-neutral test period; and
   running a diagnostic test of one or more climate control components of the climate controlled mobile cargo container during the cargo neutral test period while maintaining selected environmental conditions in the mobile cargo container;
   wherein detecting a cargo-neutral testing opportunity includes determining a first operating mode, a second operating mode different than the first operating mode and a transition from the first operating mode to the second operating mode, wherein the first operating mode comprises a first set of machinery states and the second operating mode comprises a second set of machinery states different than the first set of machinery states.

13. The method of claim 12, wherein determining the first operating mode includes sensing a current operating mode and determining the second operating mode includes predicting a future operating mode.

14. The method of claim 12, wherein determining the first operating mode includes sensing one of a system start-up mode, a cooling mode, a fan speed mode, and a defrost mode.

15. The method of claim 14, wherein determining the second operating mode includes predicting one of the cooling mode, the fan speed mode, and the defrost mode.

16. The method of claim 12, wherein running the diagnostic test includes running at least one of an electrical response test, a sensor response test, a multiple sensor correlation test, a system/environment correlation test, and a refrigerant flow test.

17. The method of claim 12, wherein running the diagnostic test includes running a diagnostic of one or more active climate control components.

18. The method of claim 17, wherein running the diagnostic test includes selecting a cargo-neutral diagnostic test of at least one of the one or more climate control components.

19. The method of claim 12, wherein selecting the cargo-neutral diagnostic test includes selecting a cargo-neutral diagnostic test sequence of the cargo-neutral diagnostic test.

20. The method of claim 12, wherein running the diagnostic test of one or more climate control components includes implementing a passive diagnostic test of the one or more climate control components.

* * * * *